(12) United States Patent
Ji et al.

(10) Patent No.: US 11,837,756 B2
(45) Date of Patent: Dec. 5, 2023

(54) ION FILTER FOR FUEL-CELL STACK

(71) Applicants: Hyundai Motor Company, Seoul (KR); Kia Corporation, Seoul (KR); Mahle Donghyun Filter Systems Co., Ltd., Hwaseong-si (KR)

(72) Inventors: Hyun Ju Ji, Seoul (KR); Hun Woo Park, Namyangiu-Si (KR); Sun Ae Park, Seongnam-si (KR); Hwan Choi, Anyang-si (KR)

(73) Assignees: Hyundai Motor Company, Seoul (KR); Kia Corporation, Seoul (KR); Mahle Donghyun Filter Systems Co., Ltd., Hwaseong-si (KR)

( * ) Notice: Subject to any disclaimer, the term of this patent is extended or adjusted under 35 U.S.C. 154(b) by 204 days.

(21) Appl. No.: 17/404,049

(22) Filed: Aug. 17, 2021

(65) Prior Publication Data
US 2022/0209261 A1    Jun. 30, 2022

(30) Foreign Application Priority Data
Dec. 28, 2020  (KR) .......................... 10-2020-0184119

(51) Int. Cl.
*H01M 8/04044*  (2016.01)
*B01D 15/22*  (2006.01)
*B01D 15/36*  (2006.01)

(52) U.S. Cl.
CPC ........ *H01M 8/04044* (2013.01); *B01D 15/22* (2013.01); *B01D 15/361* (2013.01)

(58) Field of Classification Search
CPC .. H01M 8/04044; B01D 15/22; B01D 15/361
See application file for complete search history.

(56) References Cited

U.S. PATENT DOCUMENTS

| | | | |
|---|---|---|---|
| 7,947,171 B2 | 5/2011 | Takemoto | |
| 2006/0035120 A1* | 2/2006 | Sakai | ................ H01M 8/04223 429/444 |
| 2014/0120432 A1* | 5/2014 | Na | ..................... H01M 8/04044 429/410 |

FOREIGN PATENT DOCUMENTS

| | | |
|---|---|---|
| JP | 2009245862 A | 10/2009 |
| KR | 20200070718 A | 6/2020 |

* cited by examiner

*Primary Examiner* — Benjamin L Lebron
(74) *Attorney, Agent, or Firm* — MORGAN, LEWIS & BOCKIUS LLP

(57) ABSTRACT

An ion filter for a fuel-cell stack, which is configured for overcoming restrictions related to hydraulic head on the ion filter in a fuel-cell system and has a simplified structure, may include a manifold unit of diverging a coolant introduced from an outside; and an ion filter unit connected to the manifold unit to receive the coolant from the manifold unit and including a cartridge assembly having an ion filter resin.

19 Claims, 7 Drawing Sheets

ION FILTER FOR FUEL-CELL STACK

CROSS-REFERENCE TO RELATED APPLICATION

The present application claims priority to Korean Patent Application No. 10-2020-0184119, filed Dec. 28, 2020, the entire contents of which is incorporated herein for all purposes by this reference.

BACKGROUND OF THE INVENTION

Field of the Invention

The present invention relates to an ion filter. More particularly, it relates to an ion filter for a fuel-cell stack, which is capable of overcoming restrictions related to hydraulic head of the ion filter in a fuel-cell system and has a simplified structure.

Description of Related Art

A fuel-cell system generates electrical energy through electrochemical reaction of reaction gas in a fuel-cell stack. The fuel-cell stack is connected both to an air supply device configured to supply air including oxygen required for the electrochemical reaction and to a hydrogen supply device configured to supply hydrogen for use as fuel. Furthermore, the fuel-cell system includes a system configured to manage heat and water, which discharges heat and water produced as by-products from the electrochemical reaction in the fuel-cell system.

Accordingly, the fuel-cell stack generates electrical energy through the electrochemical reaction of hydrogen and oxygen, which are reaction gases, and discharges heat and water as byproducts of the electrochemical reaction. Accordingly, to prevent an increase in temperature of the fuel-cell stack, the fuel-cell system includes a water-cooling type cooling device for the stack, in which a coolant is circulated through a coolant channel in the stack for cooling the stack.

An ion filter is provided in a circulation line of the coolant exiting the stack after circulating the stack. The ion filter for a fuel cell maintains below a certain level electric conductivity which is increased by cations and anions present in the coolant, increasing the stability of electric insulation of the vehicle.

An ion filter cartridge filled with an ion-exchange resin is provided inside an ion filter housing. The cartridge needs to be replaced every certain time period due to a filtering lifespan of the ion-exchange resin. As such period maintenance is required, an upper portion of the ion filter housing must be aligned with the top portion of a thermal management system (TMS) to minimize leak of the coolant that happens during replacement of the cartridge.

As illustrated in FIG. 1, the upper portion of an ion filter housing 610 is disposed to be substantially aligned with the top line of the thermal management system (TMS), which is denoted by A1. To the present end, the length of a mounting bracket 630 is increased such that the upper portion of the ion filter housing 610 is positioned at line A1.

If the upper portion of the ion filter housing 610 is positioned at line A2, that is, if the upper portion of the ion filter housing 610 is positioned lower than line A1, the upper portion of the ion filter housing 610 becomes lower than the top portion of the coolant line. In the instant case, there is a problem in that loss of the coolant becomes excessive after replacement of the ion filter cartridge.

If the upper portion of the ion filter housing 610 is positioned approximately at line A3, the upper portion of the ion filter housing 610 becomes higher than the top portion of the coolant line. In the instant case, air bubbles may be captured in the ion filter, and flow of the coolant may slow down.

Hence, the ion filter is subject to limitations in arrangement; that is, the ion filter must be aligned with the top portion of the thermal management system (TMS). Moreover, the increase in length of the mounting bracket 630 causes the total weight and cost to go up.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an ion filter configured for overcoming existing restrictions related to hydraulic head of the ion filter in a fuel-cell system.

Various aspects of the present invention are directed to providing an ion filter that allows an optimized arrangement of the ion filter in a fuel-cell system.

Various aspects of the present invention are directed to providing an ion filter facilitating replacement of an ion-filter cartridge.

The objects of the present invention are not limited to those described above, and other unmentioned objects of the present invention will be clearly understood by a person of ordinary skill in the art from the following description.

The features of the present invention to accomplish the object of the present invention and to perform characteristic functions of the present invention, a description of which will follow, are as follows.

Various aspects of the present invention are directed to providing an ion filter for a fuel-cell stack includes a manifold unit of diverging a coolant introduced from an outside; and an ion filter unit connected to the manifold unit to receive the coolant from the manifold unit and including a cartridge assembly having an ion filter resin.

Other aspects and exemplary embodiments of the invention are discussed infra.

The above and other features of the invention are discussed infra.

It is understood that the term "vehicle" or "vehicular" or other similar term as used herein is inclusive of motor vehicles in general such as passenger vehicles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuels derived from resources other than petroleum. As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
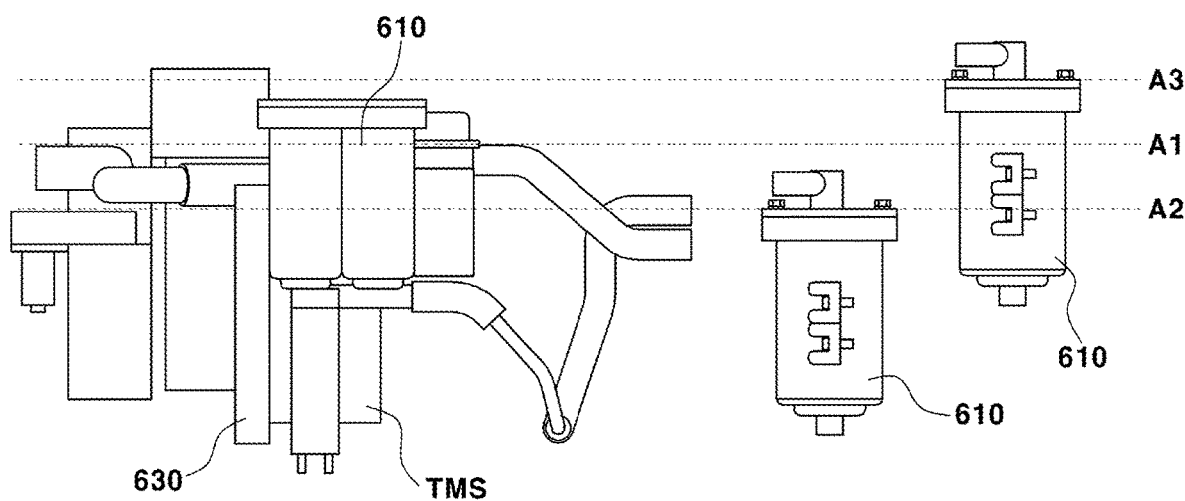
FIG. 1 is a view exemplarily illustrating a position of an ion filter with respect to a thermal management system of a fuel-cell system.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it should be understood that they should not be construed as being limited to the exemplary embodiments described in the exemplary embodiment, but include all of modifications, equivalents, or substitutes included in the spirit and scope of the present invention.

It will be understood that, although the terms "first," "second," etc., may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the exemplary embodiment, specify the presence of stated components, steps, operations, or elements, but do not preclude the presence or addition of one or more other components, steps, operations, or elements thereof.

Hereinafter, the present invention will be described in detail with reference to the accompanying drawings.

Figure 2:
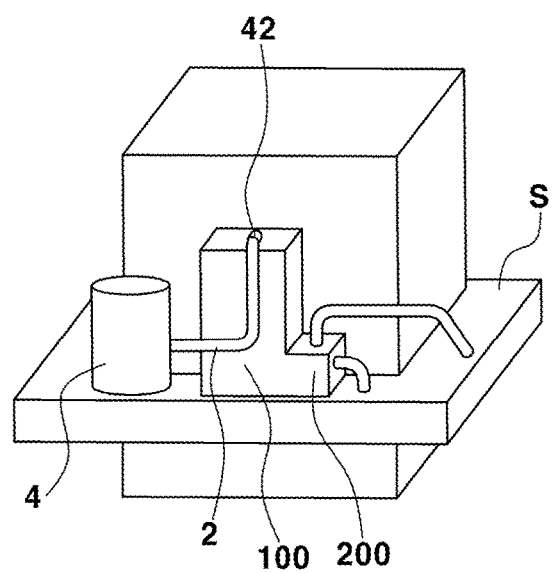
FIG. 2 is a perspective view schematically illustrating a fuel-cell stack including an ion filter according to various exemplary embodiments of the present invention.

As illustrated in FIG. 2, an ion filter according to various exemplary embodiments of the present invention includes an ion filter unit 100 and a manifold unit 200. The ion filter unit 100 and the manifold unit 200 may be provided in a single body 10. The ion filter according to various exemplary embodiments of the present invention as a module is mounted on a fuel-cell stack S.

Figure 3:
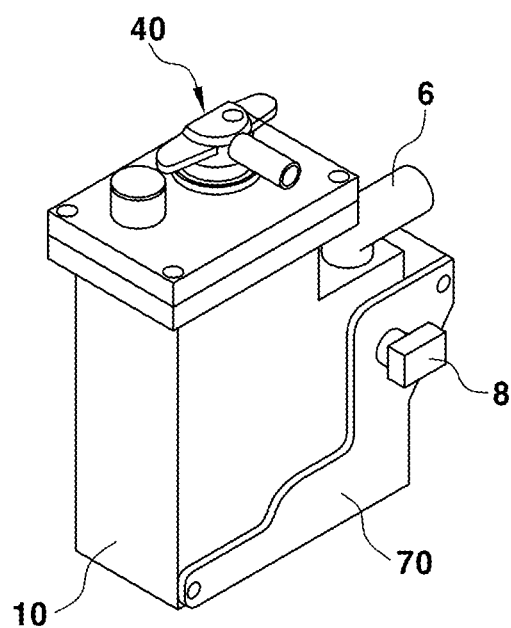
FIG. 3 is a perspective view of the ion filter according to various exemplary embodiments of the present invention.
Figure 4:
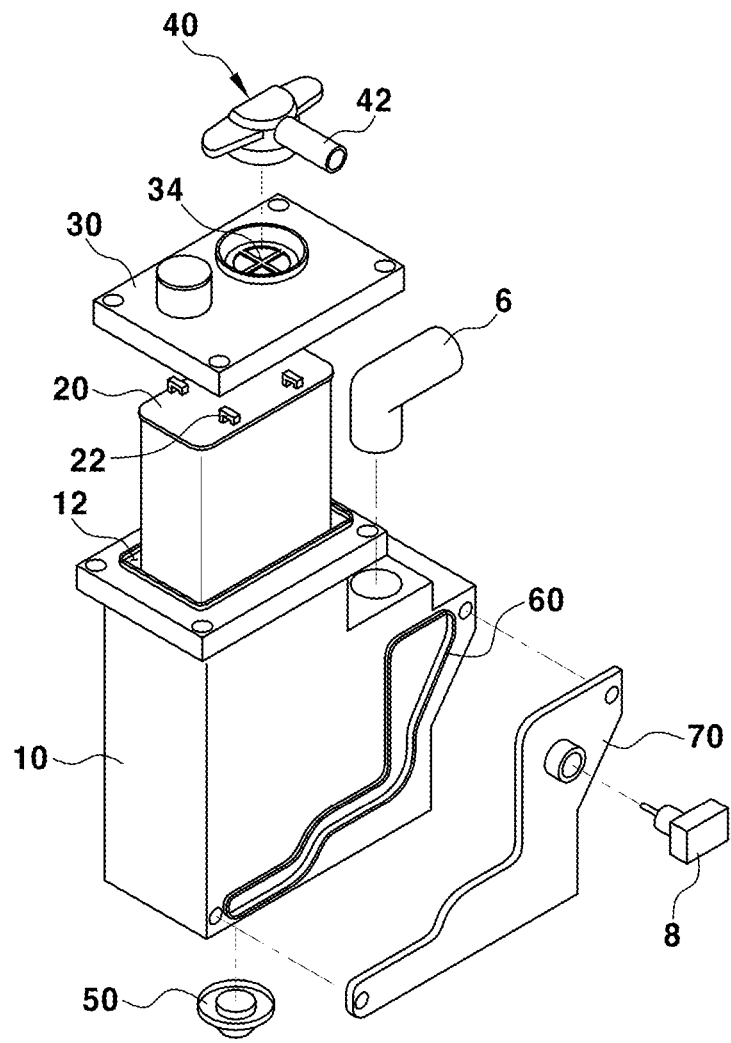
FIG. 4 is an exploded perspective view of the ion filter according to various exemplary embodiments of the present invention.
Figure 5:
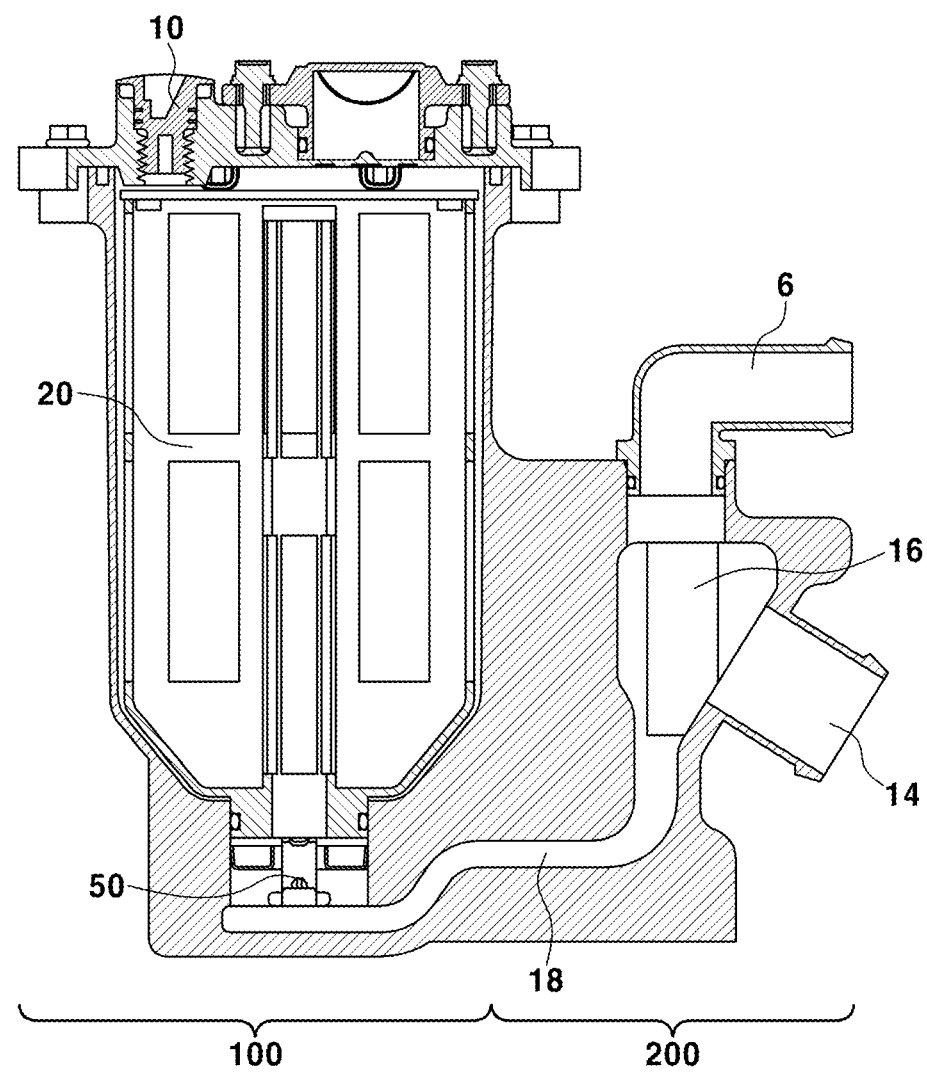
FIG. 5 is a cross-sectional view of the ion filter according to various exemplary embodiments of the present invention.

Referring to FIG. 3, FIG. 4, and FIG. 5, a reception space 12 including an empty space is provided in the body 10. A cartridge assembly 20 is received in the reception space 12. The cartridge assembly 20 includes an ion filter resin for filtering ions from the coolant and is disposed in the reception space 12 to be removable from the body 10.

A lid 30 is mounted above the reception space 12 of the body 10 to close the reception space 12. The lid 30 sealingly maintains the coolant in the reception space 12. The lid 30 may be coupled to the body 10 using fastening elements, such as bolts. According to various exemplary embodiments of the present invention, the removable lid 30 can make the reception space 12 easily accessible and seal between the body 10 and the lid 30.

Figure 6A:
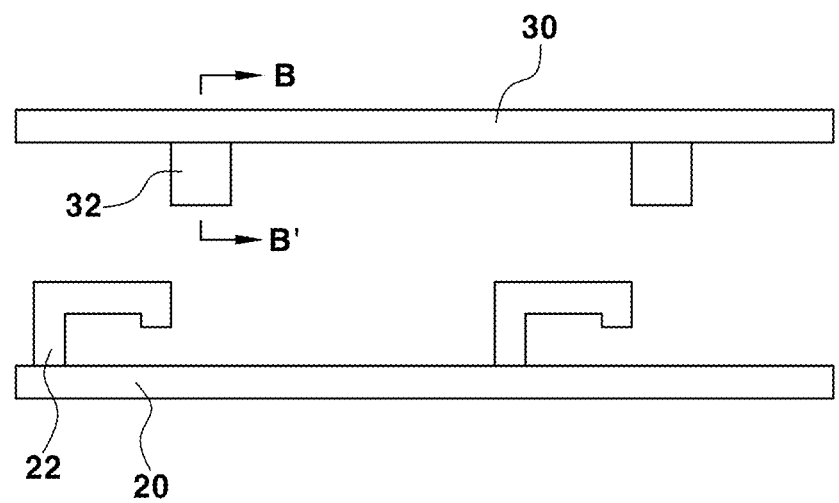
FIG. 6A is a view exemplarily illustrating the coupling structure between a lid and an ion filter assembly according to various exemplary embodiments of the present invention.
Figure 6B:
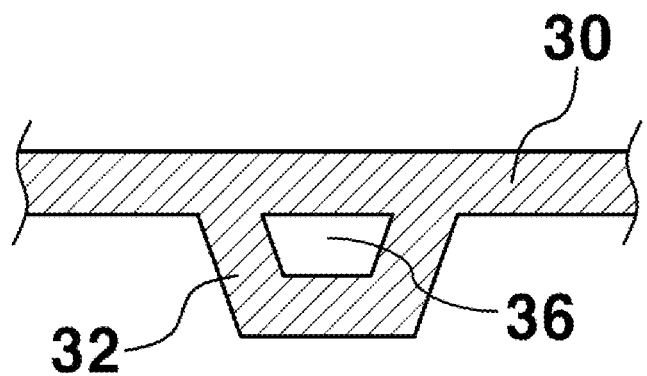
FIG. 6B is a cross-sectional view taken along line B-B' in FIG. 6A.

Referring to FIG. 6A and FIG. 6B, according to various exemplary embodiments of the present invention, a coupling structure is provided between the lid 30 and the cartridge assembly 20. The upper surface of the cartridge assembly 20 has one or more fitting portions 22, and the lower surface of the lid 30 has one or more receiving portions 32. As a non-limiting example, the fitting portion 22 may be formed as a hook, and the receiving portion 32 may be formed as a loop or a ring. Accordingly, when the lid 30 is separated from the body 10 and is then pulled upwards, the cartridge assembly 20 is also separated from the reception space 12, improving the convenience of replacement of the cartridge assembly.

In an exemplary embodiment of the present invention, the receiving portion 32 may include a locking hole 36 into which an end portion of the fitting portion 22 is locked.

The lid 20 has an exit hole 34. The exit hole 34 allows the reception space 12 in the body 10 to communicate with the outside.

A port unit 40 is mounted on the lid 30. The port unit 40 is mounted on the exit hole 34. In other words, the port unit 40 is sealingly coupled to the exit hole 34 such that the coolant does not leak between the exit hole 34 and the port unit 40 while the port unit 40 communicates with the reception space 12 through the exit hole 34. The port unit 40 is provided with a port 42 such that the coolant introduced into the port unit 40 through the exit hole 34 is discharged to the outside through the port 42.

The port unit 40 is connected to an external component via a pipe 2 and is provided with an outlet isolation valve 4 to block the flow of the coolant to the outside. According to various exemplary embodiments of the present invention, the outlet isolation valve is a coolant channel control valve 4. According to various exemplary embodiments of the present invention, the number of components may be reduced by utilizing the coolant channel control valve which is basically provided in a fuel-cell stack.

The body 10 is provided with the manifold unit 200 adjacent to the ion filter unit 100. The manifold unit 200 includes an inlet 14, a branched channel 16 and a filter channel 18. The coolant to be filtered is introduced into the inlet 14, and a portion of the coolant which is introduced through the inlet 14 flows through the branched channel 16 and is used to cool external components or the fuel-cell stack S. A nipple 6 is mounted to the outlet of the branched channel 16. According to various exemplary embodiments of the present invention, the inlet 14 is inclined upwards, the branched channel 16 is positioned above the inlet 14, and the filter channel 18 is positioned under the inlet 14.

The filter channel 18 is formed in the body 10 to extend to the ion filter unit 100 from the manifold unit 200. In other words, the filter channel 18 is formed through a portion of the body 10. The filter channel 18 is formed in a lower portion of the body 10, extends in the lateral direction of the body 10, and partially has a slant.

The filter channel 18 directs the coolant introduced through the inlet 14 toward the ion filter unit 100 or the cartridge assembly 20 in the reception space 12. In other words, the filter channel 18 extends to the cartridge assembly 20 of the ion filter unit 100.

A valve 50 is disposed at a lower end portion of the cartridge assembly 20. The valve 50 is provided between the filter channel 18 and the inlet of the cartridge assembly 20. The valve 50 is configured to prevent the coolant introduced into the cartridge assembly 20 through the filter channel 18 from flowing back in the reverse direction thereof. The valve 50 is configured to prevent leakage of the coolant upon disassembly of the cartridge assembly 20.

A sealing member 60 is mounted at the periphery of the filter channel 18. The sealing member 60 is configured to seal the filter channel 18 to prevent the coolant flowing in the filter channel 18 from leaking to the outside.

The sealing member 60 prevents leakage of the coolant between the filter channel 18 and a cover 70 mounted at the filter channel 18. The cover 70 is mounted on the body 10 to cover the filter channel 18. The cover 70 may be required for injection molding formability of the filter channel 18 and prevent formation of undercuts.

A temperature sensor 8 may be placed on the cover 70. The temperature sensor 8 can measure the temperature of the coolant passing through the filter channel 18.

Figure 7:
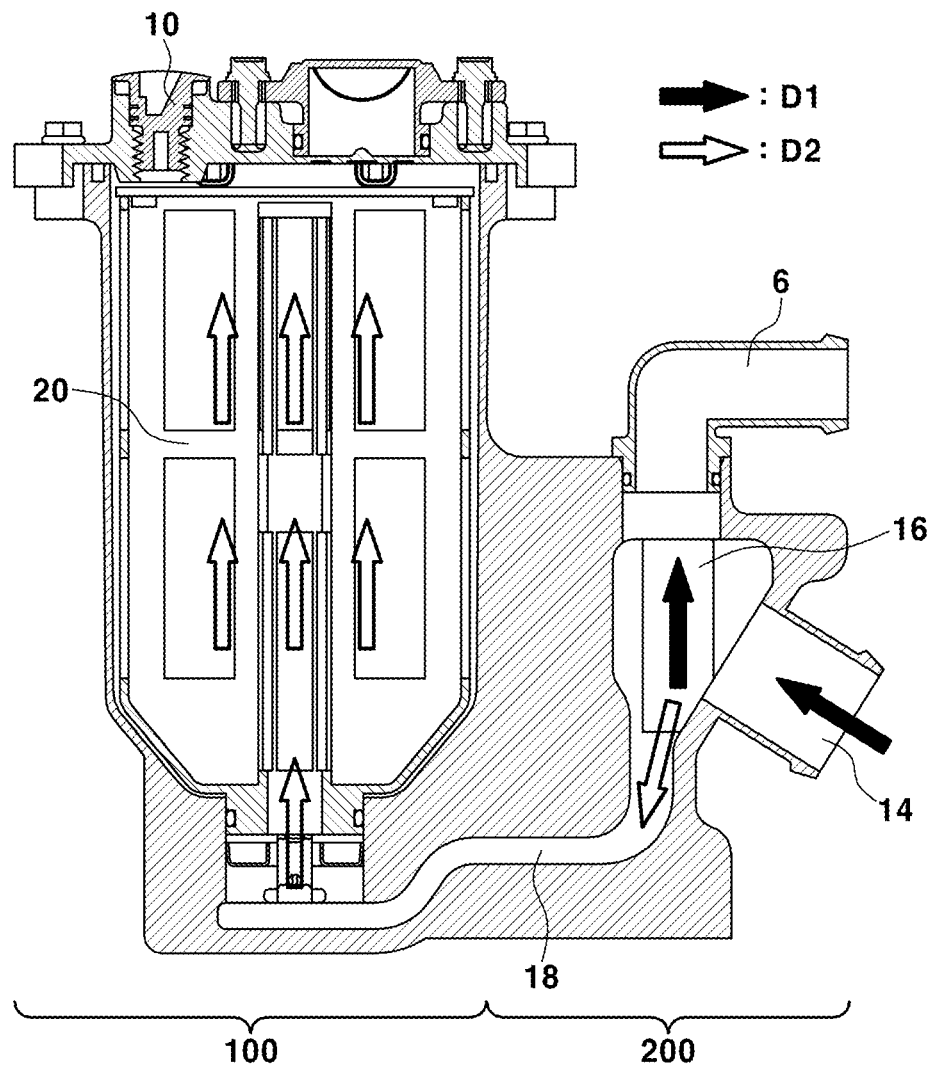
FIG. 7 is a cross-sectional view exemplarily illustrating a flow path of a coolant in the ion filter according to various exemplary embodiments of the present invention.

As illustrated in FIG. 7, a part of the coolant introduced into the manifold unit 200 of the body 10 through the inlet 14 is supplied to the fuel-cell stack through the branched channel 16 and the nipple 6 (D1). Another part of the coolant in the manifold 200 is directed toward the filter channel 18, and flows to the ion filter unit 100 through the filter channel 18 (D2). The coolant flows to the cartridge assembly 20 through the valve 50 provided between the cartridge assembly 20 and the filter channel 18. Then the coolant is filtered in the cartridge assembly 20. The coolant filtered through the cartridge assembly 20 flows to the outside of the body 10 through the exit hole 34 in the lid 30 and is discharged from the port 42 through the port unit 40. According to various exemplary embodiments of the present invention, since the inlet line for the coolant is formed in the body 10 itself, the number of components may be reduced, whereby the structure may be simplified.

Figure 8:
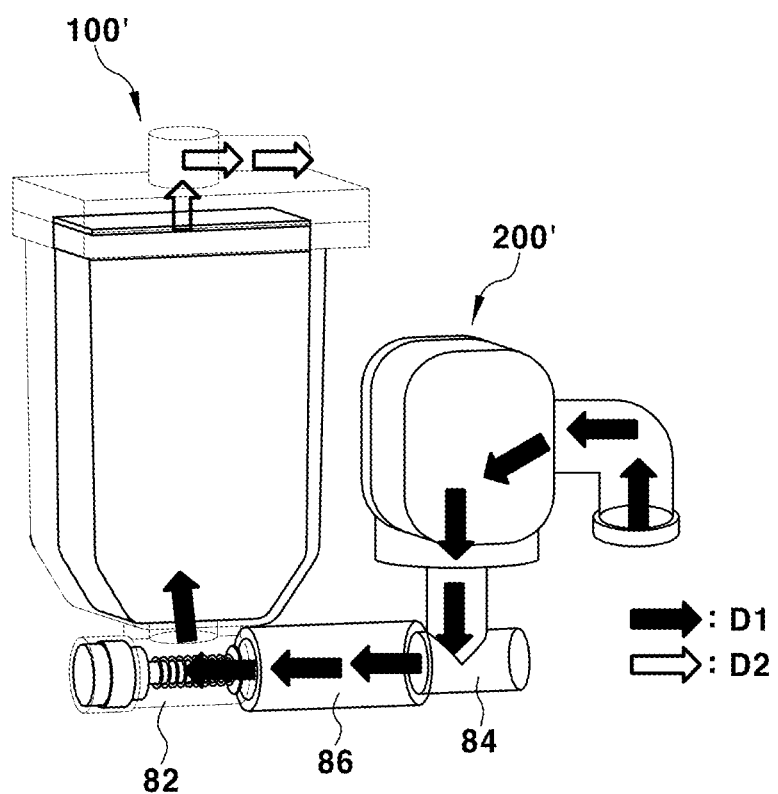
FIG. 8 is a perspective view of an ion filter according to various exemplary embodiments of the present invention.

Referring to FIG. 8, an ion filter according to various exemplary embodiments of the present invention may be constructed such that an ion filter unit 100' and a manifold unit 200' are separable from each other.

In the exemplary embodiment of the present invention, other components are configured in the same manner as in the previous embodiment, but the filter channel 18 between the ion filter unit 100' and the manifold unit 200' is not formed in the body 10 itself. Instead, the manifold unit 200' communicates with the ion filter unit 100' via a pipe element 86.

A coupling pipe 82 communicating with the cartridge assembly 20 inside the reception space 12 is provided in the lower portion of the ion filter unit 100'. Also, a connecting pipe 84 communicating with the manifold unit 200' is provided in the lower portion of the manifold unit 200'.

The coupling pipe 82 and the connecting pipe 84 are configured to be coupled to end portions of the pipe element 86, respectively. Consequently, the coolant to be filtered, which is discharged from the connecting pipe 84 through the manifold unit 200', flows through the pipe element 86 and reaches the reception space 12 or the cartridge assembly 20 through the coupling pipe 82 (D1). The coolant filtered in the cartridge assembly 20 exits the ion filter (D2).

According to various exemplary embodiments of the present invention, since the ion filter is modular in the fuel-cell stack, the overall system may be simplified. In the conventional technology, the fuel-cell stack and the ion filter are configured to be separated from each other, and it is necessary to provide two hoses for the ion filter, that is, an inlet hose and an outlet hose. Furthermore, the ion filter may be disposed at the top portion of the system owing to restrictions to hydraulic head. In contrast, the present invention is configured to address restrictions related to the hydraulic head that are conventionally imposed on the ion filter by modularization of the ion filter with the fuel-cell stack, integral formation of the manifold and mounting of the valve serving to prevent counterflow of coolant. Furthermore, since the flow path is formed in the ion filter, it is possible to omit the inlet hose.

As is apparent from the above description, various aspects of the present invention are directed to providing an ion filter configured for overcoming existing hydraulic-head-related restrictions on the ion filter in a fuel-cell system.

Various aspects of the present invention are directed to providing an ion filter which allows an optimized arrangement of the ion filter in a fuel-cell system.

Furthermore, various aspects of the present invention are directed to providing an ion filter which makes it easy to replace an ion filter cartridge.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An ion filter apparatus for a fuel-cell stack, the ion filter apparatus comprising:
    a manifold unit receiving a coolant introduced from an outside and diverging the received coolant to at least one part of the coolant; and
    an ion filter unit connected to the manifold unit to receive a first part of the at least one part of the coolant from the manifold unit and including a cartridge assembly having an ion filter resin,
    wherein the manifold unit and the ion filter unit are integrally formed with each other.

2. The ion filter apparatus of claim 1, wherein the manifold unit and the ion filter unit are configured to fluidically communicate with each other via a filter channel.

3. The ion filter apparatus of claim 2, wherein the filter channel is provided with a valve configured to prevent counterflow the first part of the at least one part of the coolant.

4. The ion filter apparatus of claim 3, wherein the filter channel is connected to the cartridge assembly, and the valve is provided between an outlet of the filter channel and an inlet of the cartridge assembly.

5. The ion filter apparatus of claim 1, wherein the manifold unit includes:
    an inlet receiving the coolant from an outside source;
    a branched channel fluidically communicating with the inlet directing a second part of the at least one part of the coolant in a first direction; and
    a filter channel communicating with the inlet and directing the first part of the at least one part of the coolant in a second direction different from the first direction thereof.

6. The ion filter apparatus of claim 5, wherein the filter channel is connected to the ion filter unit.

7. The ion filter apparatus of claim 6, wherein the ion filter unit has a reception space receiving the cartridge assembly.

8. The ion filter apparatus of claim 7, wherein the reception space is closed by a lid being detachable from the ion filter unit.

9. The ion filter apparatus of claim 8, wherein the lid includes a receiving portion formed in a lower surface of the lid, and the cartridge assembly includes a fitting portion being insertable into the receiving portion.

10. The ion filter apparatus of claim 9,
    wherein the receiving portion of the lid is in an annular shape and the fitting portion of the cartridge assembly is in a shape of "L" in a cross section thereof and insertable into the receiving portion.

11. The ion filter apparatus of claim 9,
    wherein the receiving portion of the lid includes a locking hole, and
    wherein the fitting portion of the cartridge assembly is in a shape of "L" in a cross section thereof and an end portion of the fitting portion is insertable into the locking hole of the receiving portion.

12. The ion filter apparatus of claim 8, wherein the lid has an exit hole penetrating a portion of the lid and communicating the reception space with an outside of the ion filter unit.

13. The ion filter apparatus of claim 12,
    wherein the ion filter unit includes a port unit configured to discharge the first part of the at least one part of the coolant filtered through the cartridge assembly, and
    wherein the port unit is sealingly mounted in the exit hole and having a port communicating with the exit hole.

14. The ion filter apparatus of claim 1, wherein the ion filter unit includes a port unit configured to discharge the first part of the at least one part of the coolant filtered through the cartridge assembly.

15. The ion filter apparatus of claim 5, wherein the filter channel is formed through a portion of the ion filter unit and a portion of the manifold unit, and a cover is sealingly coupled to the filter channel.

16. The ion filter apparatus of claim 15, wherein a sealing member is located between the cover and the filter channel.

17. The ion filter apparatus of claim 1, wherein the manifold unit and the ion filter unit are configured to be separable from each other.

18. The ion filter apparatus of claim 17,
    wherein the manifold unit and the ion filter unit are connected to each other via a pipe element to be separable, and
    wherein a connecting pipe is coupled to a first end portion of the pipe element in a lower portion of the manifold unit to fluidically communicate with the pipe element and a coupling pipe is coupled to a second end portion of the pipe element in a lower portion of the ion filter unit to fluidically communicate with the pipe element.

19. The ion filter apparatus of claim 12, wherein the port unit is connected to a coolant channel control valve of the fuel-cell stack.

* * * * *